Nov. 22, 1927.

W. E. NICKERSON

FINDER

Filed July 16, 1924

Inventor
William E. Nickerson
by Mitchell, Chadwick & Kent
Attorneys

Nov. 22, 1927.  W. E. NICKERSON  1,650,376
FINDER
Filed July 16, 1924   2 Sheets-Sheet 2
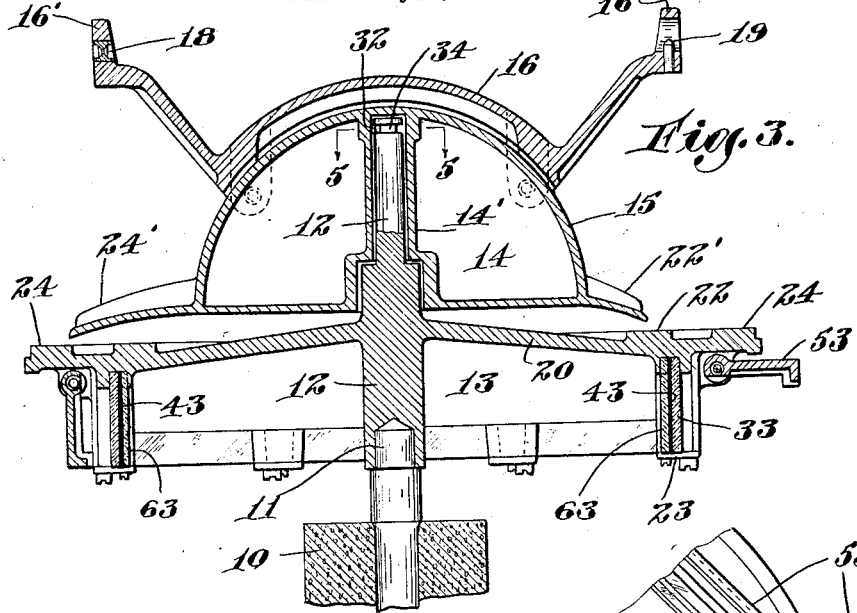
Fig. 3.
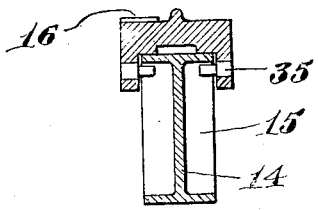
Fig. 4.
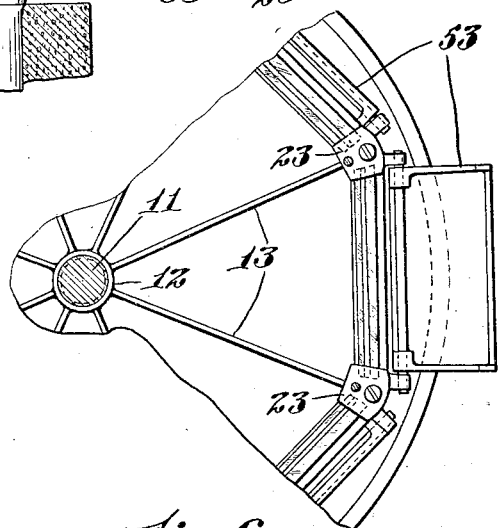
Fig. 6.
Fig. 5.
Fig. 7.
| OBJECTS | DIRECTION ° | DIP ° | DISTANCE AIR M. | DISTANCE ROAD M. |
|---|---|---|---|---|
| Mt. Washington | 285 | +5 | 51 | |
| Mt. Jefferson | 292 | +2 | 56 | |
| Mt. Madison | 297 | +3 | 60 | |
| Mt. Adams | 295 | +4 | 58 | |
| | | | | |
Inventor
William E. Nickerson
by Mitchell, Chadwick & Kent
Attorneys Patented Nov. 22, 1927.

1,650,376

UNITED STATES PATENT OFFICE.

WILLIAM E. NICKERSON, OF BOSTON, MASSACHUSETTS.

FINDER.

Application filed July 16, 1924. Serial No. 726,316.

This invention relates to finders. More particularly it relates to devices for finding or for identifying distant points of interest, such as mountain peaks, lakes, towns, which constitute fixed objects visible from a place of observation.

It is a frequent experience that strangers visiting a place where there is a considerable prospect would particularly like to know the name of some certain thing which is visible in the distance, or would like to see some certain point which they have heard is there visible. It is a purpose of the invention to meet these needs in a simple, sure and inexpensive manner. To this end the invention provides apparatus by which any point in question is segregated from all others, while being observed; and having been thus segregated is automatically described by the apparatus in terms which identify and distinguish it from all others. The segregation is accomplished by providing sights as of a rifle; the automatic distinguishing is done by providing indicators which show its direction and elevation; and the identification is completed by providing a written or printed list in which the names of the various points are coupled with their respective descriptions in terms of direction and elevation. Much use for such apparatus will be found on hotel and club house piazzas, and on monuments and observation towers; but there is an especial need for such a device on peaks which are more or less frequently visited by mountain climbers. In such cases the party arriving at the summit beholds a sea of peaks, valleys and lakes, but except in special cases the party will have no one who can identify them with certainty—and even an expert will ordinarily know but a few of them.

The invention provides for placing the knowledge of an expert at command of everyone,—and more than that, for by this apparatus it is possible to assemble and preserve an accumulation of the knowledge of various experts who may successively visit the spot, even over a period of years, each adding information about the particular region or parts regarding which he knows,—and all of this is by the apparatus made available for every casual stranger.

It is a further feature of the invention to make the apparatus durable for all seasons,—and in particular to preserve the inscriptions which are necessary parts,—notwithstanding the severe changes of sun, cloud, rain, wind and cold to which mountain tops are subject. For these purposes mere direction lines such as can be engraved in a metallic plate set on a mountain top or observation point are both insufficient and impractical. The invention provides a metallic horizontal table or circle which at the place of its manufacture can be suitably and accurately inscribed with all directions of the compass, or degrees of the circle; a meridian segment rotatable on a vertical axis, likewise accurately graduated into degrees of angle from level; a finder containing the said sights, in the vertical plane of the meridian, supported by this segment and movable over it to pitch more or less below the horizon; and a written object record. The last may be sheltered by the first,—the record, by the table,—and may be so constructed that any written intelligence can be put there at any time by anybody—or, on the other hand so as to contain identifying information put there and sealed, once for all. The latter feature is provided by sectional tablets protected in suitable frames and glass which are themselves set vertically under and protected by the metallic table.

An especial utility of the invention is in connection with fire towers overlooking nondescript forest regions. In such cases the object record of the apparatus may by field observation be co-ordinated with a map of the region, so that the direction and dip of points observed by the finder can be identified with particular points marked on the map. The map then being kept at headquarters, a telephone message of direction and dip of an observed fire as seen from the tower will identify the precise point on the map at headquarters, thus indicating the proper course for access to it, even though the night be so dark that its location cannot otherwise be identified by the observer himself.

The accompanying drawings illustrate a preferred embodiment of the invention, suitable for a mountain top. For more sheltered spots parts may be omitted; and in either case the parts may be varied as occasion may suggest.

It is intended that the patent shall cover, by suitable expression in the appended claims, whatever features of patentable novelty are herein disclosed.

In the drawings:

Figure 3 is a side elevation in medial vertical section, as on line 3—3 of Figure 1, except that one of the sheltering flaps 53 is represented as being open;

Figure 4 is an end elevation of a detail in section as on the line 4—4 of Figure 2;

Figure 5 is a plan of a detail in section on the line 5—5 of Figure 3;

Figure 6 is a bottom plan of a fragment, looking upward at the right hand portion of the apparatus arranged as in Figure 3; and Figure 7 is an elevation of a record which may be used in the apparatus.

Figure 1:
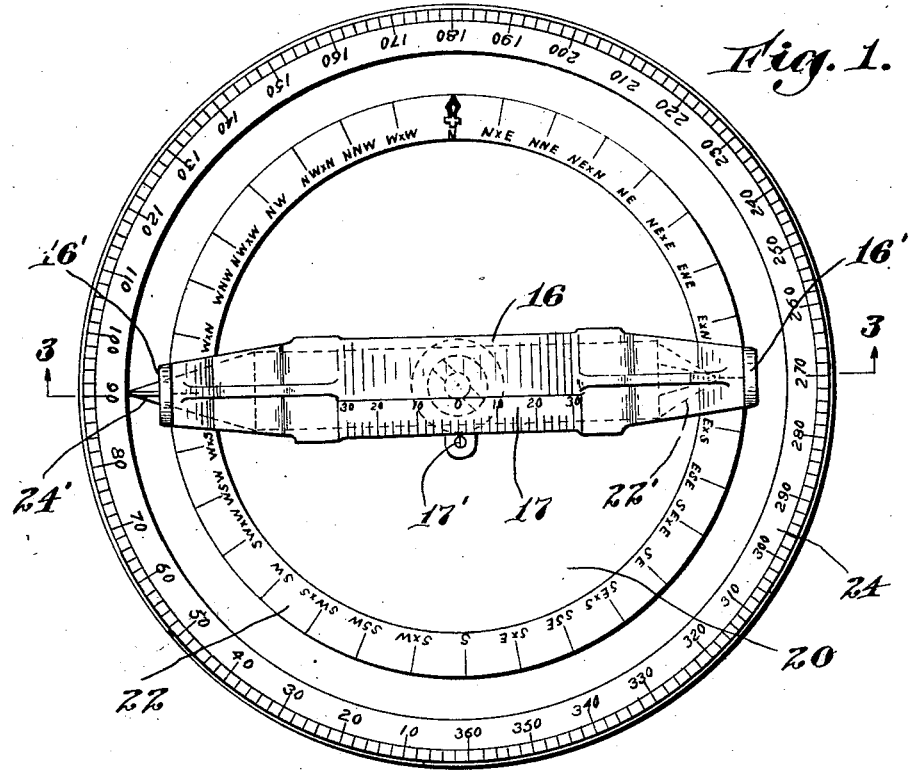
Figure 1 is a plan.
Figure 2:
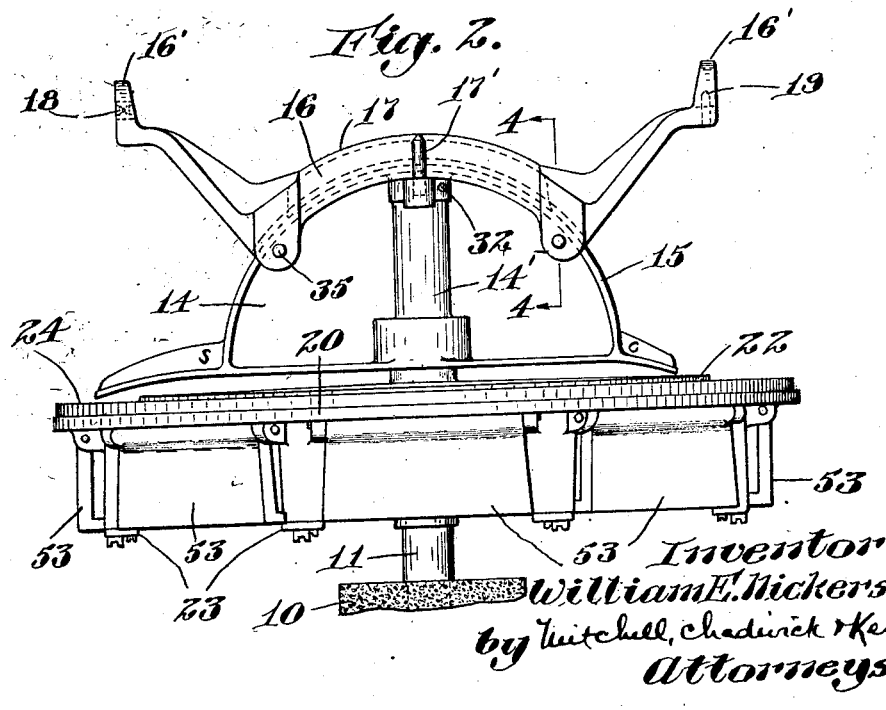
Figure 2 is a side elevation.

Referring to the drawings a rigid support, such as a concrete block 10 fast upon a foundation, constitutes a firm setting for a vertical column 12 whose upper portion constitutes a pivot. On this pivot is supported a vertical plate 14 with the axis of the pivot lying in the plane of the plate, for which purpose the central portion of the plate is thickened as necessary to receive the pivot, as at 14′. This plate is semicircular, its curved rim 15 and its bottom being flanged so that the plate is stiff. On the semicircular arc is carried a rider 16 which is so mounted that it can slide around on the arcuate rim or track 15 to any desired position and rest there by friction. The rider has two horns 16′ in the plane of the plate and sufficiently above the plate so that they constitute supports for two linear sights 18, 19, comparable to the sights of a rifle. Any desired direction is given to these sights by turning the plate or direction finder 14 on the pivot 12, and any desired dip by moving the rider or dip finder 16 on the circular rim 15 of the plate. The standard has a table or skirt 20 on which is a circular scale of angular measure which may either be marked with the directions of the compass as the scale 22 or marked with the degrees of angular measure as the scale 24 or may be otherwise marked; this being described about a vertical axis and, by the indication of a pointer 22′ or 24′ on the rotating vertical plate, designating the direction of the object that is found or to be found in whatever terms are inscribed on the scale. The rider 16 carries a scale 17 on which, by reference to a point 17′ fixed on the vertical plate 14, the dip of the line of sight to the object is designated in terms of that scale, which terms in the instance illustrated are degrees of a circle. The sight 18 consists preferably of a small orifice to which the user applies his eye. The sight 19 is a larger orifice containing a conical point at its middle. When the user looking through the orifice 18 has set the rider so that the point in the sight 19 is on the object, he reads the scale 22 or 24 and the scale 17 and this reading is to be written down in a convenient place, together with the name of the object. The same having been repeated for any objects of interest which are visible, any person subsequently wishing to know the name of one of them which he sees, as, for example, a distant peak, may train the sights upon that object, note the readings on the scales, and then by consulting the record find those readings and in connection therewith find the name of the object. Reversely, anyone desiring to look upon something known to be visible, or the general location of it if it happened to be invisible, may look in the said record and read opposite the name of the object a certain setting of the rider. Assuming it to be a particular village, he sets the pointer 24′, and the rider 16 so that its pointer 17′ conforms to the record, and upon then looking through the sights 18, 19 his eye rests upon the desired village. In case the village is not in view the record may be made to show the direction and dip, after the same have been ascertained by any suitable means, thus picking out the particular ridge or peak beyond which the object is or indicating the part of the horizon below which it lies.

The particular embodiment of the invention illustrated is adapted for exposed and solitary installation. The parts may be made entirely of non-corrosive and durable materials operating without lubrication and unaffected by severe atmospheric changes. The part 12 may be pressed down upon a pin 11 in the base and secured there by the tightness of its fit or by any suitable means. The table 20 in such case is preferably a continuous webbing of metal with ribs 13 on its under side, giving it stiffness, and with a series of peripheral frames 23 containing glass 33, protected by which there may be tablets or record sheets 43. The glass face may be protected by hinged screens 53 which normally hang in front of it but can be raised by any person wishing to look through the glass 33 at the record 43. The back of the record may be protected by other glass 63 held by putty or metallic fastening, the latter being indicated for this purpose at 23; and the tablet itself may be either of paper stock or of porcelain or the like more durable material on which pencil or ink marks are well protected by the devices described. In the apparatus illustrated there are eight radial ribs 13 with intervening sectors in each of which is a space where a card record 43 may be thus inserted; and thus the data belonging to the objects in each general direction may be conveniently seen from the position in which the user is standing when the sight is bearing on that part of the field. For use on hotel piazzas and in other protected spots the specific record holding arrangement here illustrated will usually be unnecessary, the chart of objects and positions being posted in any convenient place nearby; and indeed where the outlook is only from one side of a building the apparatus may be made with only a half circle or less of lateral swing. The pivoting arrangements may be of any suitable design. In those illustrated the vertical plate is held secured on the pivot 12 by pins 32 which engage in a groove 34 in the upstanding axle 12, thus preventing the top parts from being lifted off while permitting their free rotation. The rider 16 has surfaces conforming to the curvature of the flange 15 for slipping over it, held thereon by pins 35 engaging under the flange.

In setting the apparatus it is not necessary either to use the scale or compass directions. If this be used it is preferable to put the north thereon toward the true north, but any error in the setting of such a scale does not affect the operation of the apparatus, for the information chart is to be made according to the bearing of the fixed object as indicated on the scale when that scale has been itself fixed, and these scales are merely devices which enable the user to reset the sights in some former position in order to indicate the stated object. The apparatus can therefore be set up on a mountain top, or a piazza, without expert skill and without instruments of precision as to verticality or directions of the compass.

The durability and freedom from wear, even when set in an exposed and windy position, as on a mountain top, is another feature of the structure described, for it will be observed that the plate 14 and its rider together have surfaces which are substantially balanced about the vertical axis, and it can be made very accurately so if desired, so that the changing directions of the wind will not swing it about and thus wear its pivotal bearing.

I claim:

1. A finder comprising a support which is fixed with respect to the objects to be found; a vertical plate mounted on the support so as to turn on a vertical axis, for finding direction; the upper edge of said plate being shaped to form an arcuate track, curved about a horizontal axis; and a sighting rider with under surface resting on said track, movable thereover, for finding dip, said rider engaging the track frictionally and being adapted to hold the rider in positions of various dip; there being scale means associated with each said plate and rider, respectively for indicating positions of the plate and rider about the respective axes.

2. A finder comprising a support which is fixed with respect to the objects to be found; a vertical plate suspended from the upper end of the support so as to turn on a vertical axis, for finding direction; the upper edge of said plate being shaped to form an arcuate track on the plate curved about a horizontal axis; and a rider on the track, for finding dip, having a pair of sighting arms, one at each end of the rider, and having an under surface adapted to fit said track; the said rider being wholly supported by said track, with friction drag bearing holding it in positions of various dip; there being means associated with the said plate and the said rider to identify, respectively, particular direction and dip.

3. A finder comprising a support which is fixed with respect to the objects to be found; a vertical pivot upstanding from the support; an arcuate track curved about a horizontal axis, suspended from the upper end of the pivot and adapted to turn thereon, and a sighting rider frictionally engaged slidably along the track and held by friction drag thereon; there being scale means associated with said pivot for indicating the direction of the track thereon, and scale means associated with said track for indicating the dip of the rider thereon.

4. A finder comprising a support which is fixed with respect to the objects to be found; a vertical pivot upstanding from the support; an arcuate track with side rims curved about a horizontal axis and mounted to turn on the pivot; a sighting rider mounted frictionally on said track and adapted to be held in positions thereon by friction drag; and means for securing the said track and rider movably on their respective pivot and track, comprising, for the track, pins operating in a groove in the pivot, and, for the rider, pins engaging under said rims on the track; there being means associated with said track and said rider for indicating their direction and dip.

Signed at Boston, Massachusetts, this eighteenth day of June, 1924.

WILLIAM E. NICKERSON.